(12) United States Patent
Gasmen et al.

(10) Patent No.: US 8,794,910 B2
(45) Date of Patent: Aug. 5, 2014

(54) GAS TURBINE ENGINE SYNCHRONIZING RING BUMPER

(75) Inventors: Eugene C. Gasmen, Rocky Hill, CT (US); Stanley Wiecko, Newington, CT (US); Bernard W. Pudvah, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 570 days.

(21) Appl. No.: 13/018,503

(22) Filed: Feb. 1, 2011

(65) Prior Publication Data

US 2012/0195751 A1    Aug. 2, 2012

(51) Int. Cl.
    *F01D 17/12*    (2006.01)
    *F01B 25/02*    (2006.01)

(52) U.S. Cl.
    USPC ........................................................... 415/160

(58) Field of Classification Search
    CPC ............. F01D 9/00; F01D 9/04; F01D 9/041; F01D 25/04; F05D 2260/96
    USPC .......... 415/40, 149.2, 149.4, 150, 153.2, 165, 415/191, 211.2, 119, 159, 160; 416/44–47, 416/103–107, 154, 166; 403/408.1, 221, 403/228, 243, 365; 411/546, 111–113; 16/82, 83, 85, 86 R, 86 A, 2.1, 2.5
    See application file for complete search history.

(56) References Cited

U.S. PATENT DOCUMENTS

| 2,209,274 | A | * | 7/1940 | Jaberg .............................. 174/83 |
| 2,933,234 | A | | 4/1960 | Neumann |
| 3,314,595 | A | | 4/1967 | Burge et al. |
| 3,502,260 | A | * | 3/1970 | Koff .............................. 415/148 |
| 3,584,857 | A | | 6/1971 | Hipsher |
| 3,685,920 | A | * | 8/1972 | Burge .............................. 415/147 |
| 4,049,360 | A | | 9/1977 | Snell |
| 4,050,844 | A | * | 9/1977 | Miller et al. ................... 415/147 |
| 4,137,602 | A | * | 2/1979 | Klumpp, Jr. ..................... 16/2.1 |

(Continued)

FOREIGN PATENT DOCUMENTS

| EP | 1403467 | 3/2004 |
| EP | 1 524 413 A2 | 4/2005 |
| GB | 2206381 | 1/1989 |
| GB | 2273744 | 6/1994 |

OTHER PUBLICATIONS

Prior Art—PW2000 Engine (2 Figures).

(Continued)

*Primary Examiner* — Edward Look
*Assistant Examiner* — Wayne A Lambert
(74) *Attorney, Agent, or Firm* — Carlson, Gaskey & Olds, P.C.

(57) ABSTRACT

A synchronizing assembly for a gas turbine engine includes a synchronizing ring. A composite bumper is secured to the synchronizing ring by a fastener. A structure is arranged between the bumper and the synchronizing ring. The fastener applies a first load through the structure to the synchronizing ring and a second load through the bumper. The second load is substantially less than the first load. In one example, the structure includes a bushing that extends through a hole in the bumper. The bushing is proud of the hole on the other side of the bumper and protrudes into the counterbore. The fastener is arranged in the bushing and applies a clamping load through the bushing to secure the bumper to the synchronizing ring.

14 Claims, 5 Drawing Sheets

(56) References Cited

U.S. PATENT DOCUMENTS

| | | | |
|---|---|---|---|
| 4,494,883 A | | 1/1985 | Winter |
| 4,812,106 A | * | 3/1989 | Purgavie ............... 415/139 |
| 4,908,245 A | | 3/1990 | Shah et al. |
| 4,925,364 A | | 5/1990 | Das |
| 5,211,537 A | | 5/1993 | Langston et al. |
| 5,387,080 A | * | 2/1995 | Bouhennicha et al. ....... 415/150 |
| 5,549,448 A | | 8/1996 | Langston |
| 5,601,401 A | * | 2/1997 | Matheny et al. ........... 415/160 |
| 5,672,047 A | | 9/1997 | Birkholz |
| 6,264,412 B1 | * | 7/2001 | Nakamura et al. ........... 411/352 |
| 6,722,845 B2 | | 4/2004 | Chard et al. |
| 6,769,868 B2 | | 8/2004 | Harrold |
| 6,799,945 B2 | | 10/2004 | Chatel et al. |
| 6,884,025 B2 | | 4/2005 | Pickens et al. |
| 6,984,108 B2 | | 1/2006 | Anderson et al. |
| 7,004,723 B2 | * | 2/2006 | Raulin et al. ................ 415/160 |
| 7,094,022 B2 | | 8/2006 | Bruce |
| 7,198,454 B2 | * | 4/2007 | Evans ........................ 415/12 |
| 7,287,955 B2 | | 10/2007 | Amiot et al. |
| 7,445,427 B2 | | 11/2008 | Gutknecht et al. |
| 7,516,534 B2 | | 4/2009 | Easterbrook et al. |
| 7,524,165 B2 | | 4/2009 | Bourgoin et al. |
| 7,588,415 B2 | | 9/2009 | Giaimo et al. |
| 7,591,634 B2 | | 9/2009 | Wheeler et al. |
| 7,628,579 B2 | | 12/2009 | Giaimo et al. |
| 7,665,959 B2 | | 2/2010 | Giaimo et al. |
| 7,690,889 B2 | | 4/2010 | Giaimo et al. |
| 8,123,472 B2 | * | 2/2012 | Redgwell ................. 415/160 |
| 2003/0131443 A1 | * | 7/2003 | Trent ........................ 16/2.1 |
| 2005/0008489 A1 | * | 1/2005 | Perruchaut et al. .......... 416/160 |
| 2006/0193720 A1 | * | 8/2006 | Bromann .................. 415/160 |
| 2007/0110541 A1 | | 5/2007 | Rawlins et al. |
| 2008/0157483 A1 | * | 7/2008 | Booher et al. .............. 277/593 |
| 2008/0247693 A1 | * | 10/2008 | Schroeder et al. ........... 384/296 |

OTHER PUBLICATIONS

Partial EP Search Report for application No. EP12153322 Completed Aug. 22, 2013. Titled:Gas Turbine Engine Synchronizing Ring Bumper.

Full EP Search Report for application No. EP12153322 Completed Nov. 7, 2013. Titled:Gas Turbine Engine Synchronizing Ring Bumper.

* cited by examiner

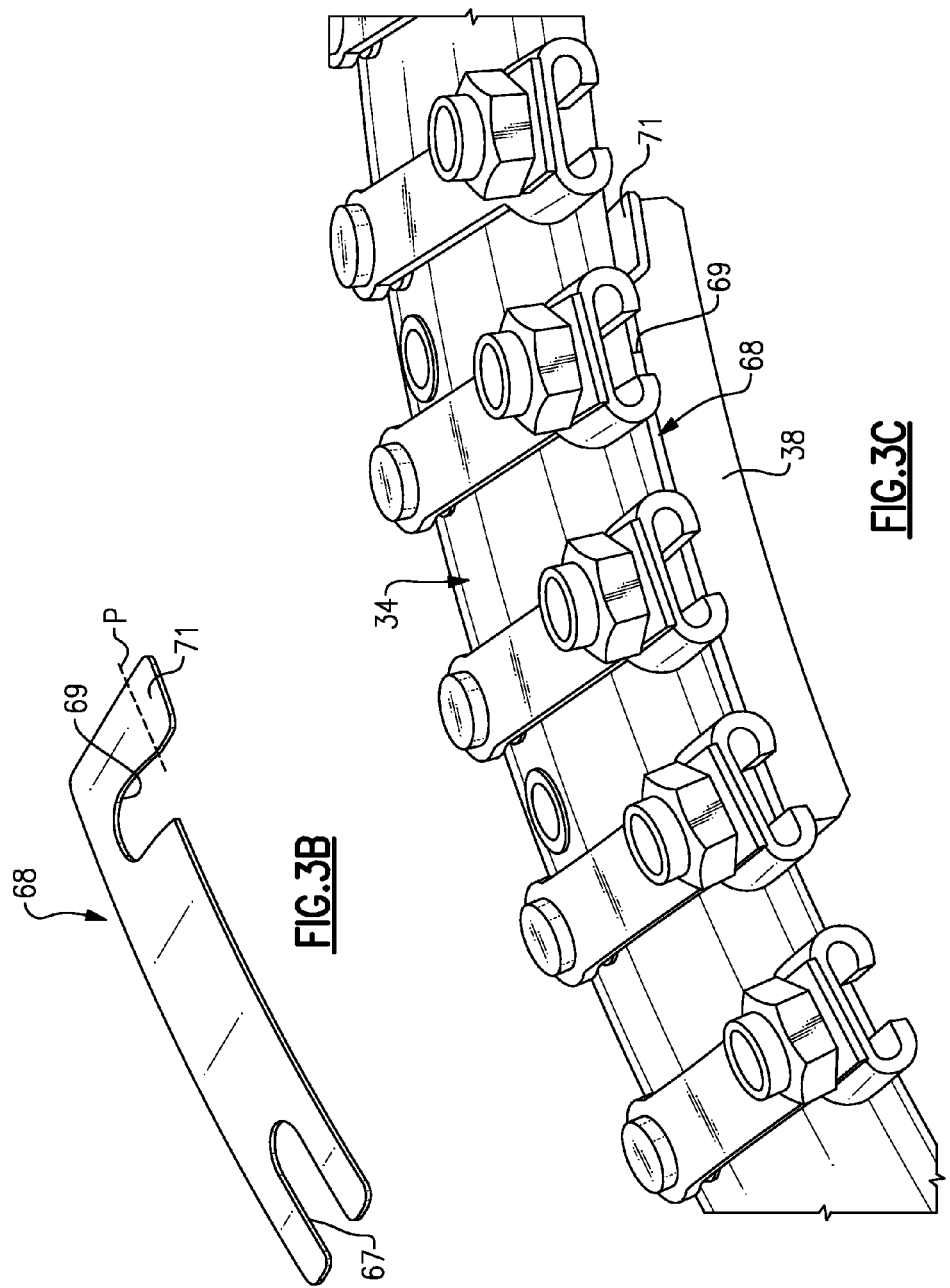

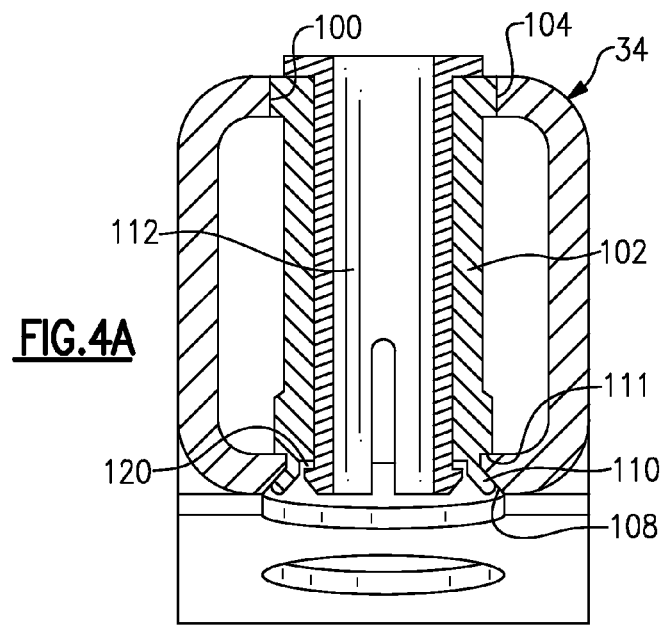
FIG.4A
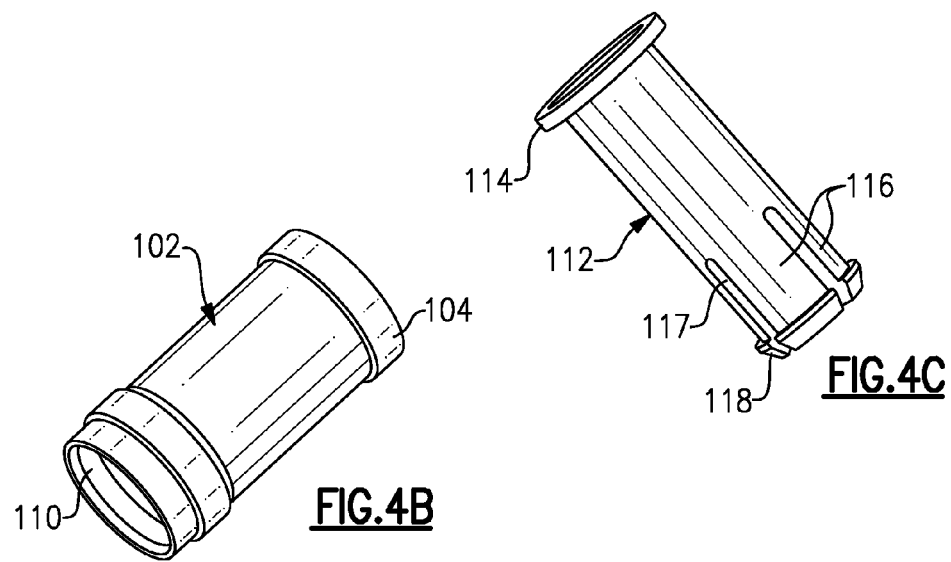
FIG.4B
FIG.4C

US 8,794,910 B2

GAS TURBINE ENGINE SYNCHRONIZING RING BUMPER

BACKGROUND

This disclosure relates to a gas turbine engine synchronizing assembly. More particularly, the disclosure relates to bumpers used between a synchronizing ring and a compressor case.

Some gas turbine engines utilize variable stator vanes that are actuated about their rotational axes to improve the overall compressor characteristics. A synchronizing assembly is used to manipulate the vanes. One type of synchronizing assembly includes a synchronizing ring that is slid relative to a compressor case by actuators. Multiple bumpers are circumferentially arranged between the synchronizing ring and the compressor case to facilitate movement of the synchronizing ring throughout the changing clearances.

In one example, the bumper is constructed from a composite material. The bumper is secured to the synchronizing ring by one or more fasteners. Typically, the composite material is arranged between a head of the fastener and the synchronizing ring such that the composite material is loaded under a clamping force. Over time, the composite material fatigues and cracks, which requires service to the synchronizing assembly.

One example bumper assembly includes a box-like structure machined out of titanium block. The box is secured to the synchronizing ring using a discrete locating pin to prevent rotation of the box during installation of a fastener used to secure the bumper assembly to the synchronizing ring. The locating pin must be very precisely machined. A composite bumper is secured within the box using an adhesive.

SUMMARY

A synchronizing assembly for a gas turbine engine includes a synchronizing ring. A composite bumper is secured to the synchronizing ring by a fastener. In one example, a bushing is press-fit and deformed to be retained within the synchronizing ring. A polymeric bearing is snap-fit into the bushing, and a clevis is rotationally supported by the bearing.

A structure is arranged between the bumper and the synchronizing ring. The fastener applies a first load through the structure to the synchronizing ring and a second load through the bumper. The second load is substantially less than the first load.

In one example, the composite bumper includes a hole with a counterbore on a side of the bumper opposite the synchronizing ring. The structure includes a bushing that extends through the hole, and the bushing is proud of the hole on the other side of the bumper and protrudes into the counterbore. The fastener is arranged in the bushing and applies a clamping load through the bushing to secure the bumper to the synchronizing ring.

A shim with a visible deformable locking tab is provided between the bumper and the synchronizing ring in one embodiment.

BRIEF DESCRIPTION OF THE DRAWINGS

The disclosure can be further understood by reference to the following detailed description when considered in connection with the accompanying drawings wherein:

FIG. 3B is a perspective view of an example shim illustrated in FIG. 3A.

FIG. 3C is a perspective view of the synchronizing assembly and bumper illustrated in FIG. 3A prior to deforming a shim tab.

FIG. 4A is a cross-sectional view of another synchronizing assembly.

FIG. 4B is a perspective view of a bushing for the synchronizing assembly illustrated in FIG. 4A.

FIG. 4C is a perspective view of a snap bearing used in the synchronizing assembly illustrated in FIG. 4A.

DETAILED DESCRIPTION

Figure 1:
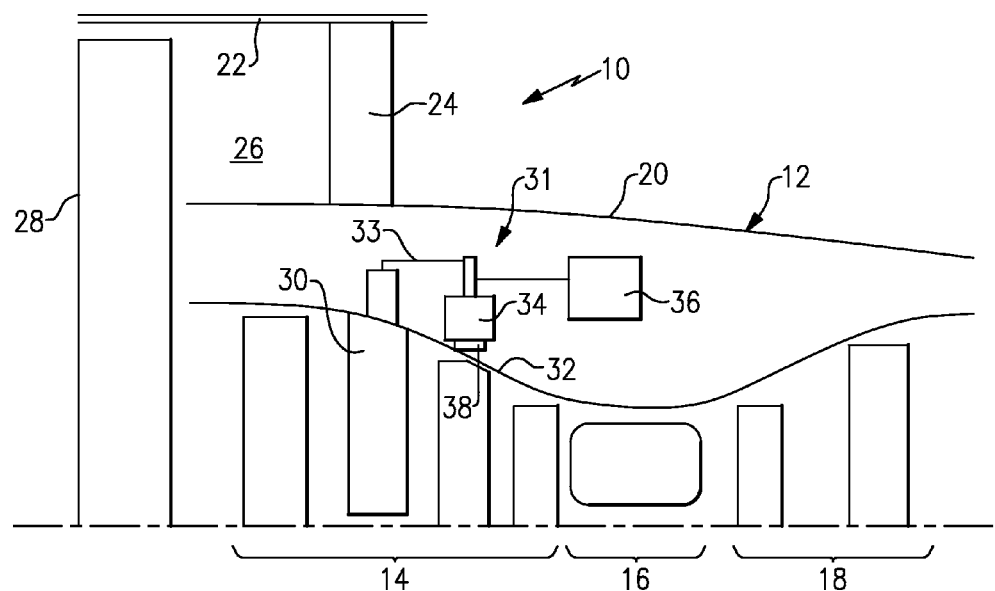
FIG. 1 is a highly schematic view of an example gas turbine engine with a synchronizing assembly.

A gas turbine engine 10 is schematically illustrated in FIG. 1. The engine 10 includes a core 12 having compressor, combustor and turbine sections 14, 16, 18, which are housed within a core nacelle 20. The core 12 is supported relative to a fan case by circumferentially arranged flow exit guide vanes 24. A fan duct 26 is provided between the fan case 22 and the core nacelle 20 and receives airflow from a fan 28.

In the example engine 10, the compressor section 14 includes at least one stage of variable stator vanes 30 that are actuated by a synchronizing assembly 31 to rotate the vanes 30 about their respective axes to improve the overall efficiency of the compressor section 14.

Figure 2:
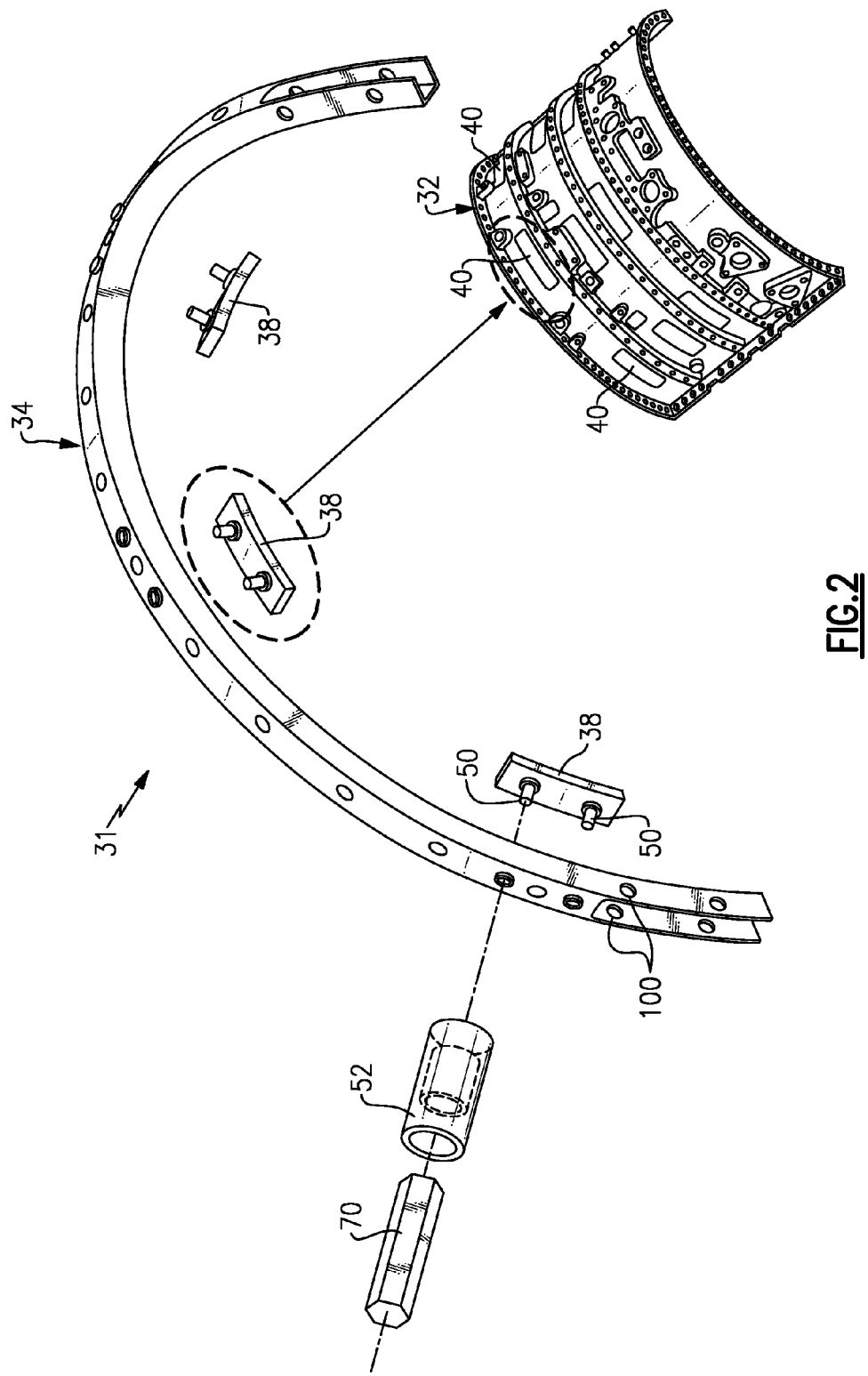
FIG. 2 is an exploded view of a portion of a synchronizing assembly and its corresponding compressor case.

The synchronizing assembly 31 includes a synchronizing ring 34 interconnected to the vanes 30 by arms 33. The synchronizing ring 34 is slidably mounted to a compressor case 32. An actuator 36 moves the synchronizing ring 34 in a generally axial direction along an arcuate path to rotate the vanes 30. Bumpers 38 are arranged circumferentially between the synchronizing ring 34 and the compressor case 32. In one example, the bumpers are constructed from a composite material, such as chopped fiber reinforced resin. In one example, the bumper is constructed from a DuPont SCP-5050. As illustrated in FIG. 2, the bumpers 38 are supported on pads 40 circumferentially arranged on the exterior of the compressor case 32.

Referring to FIGS. 2-3C, an example synchronizing assembly 31 is illustrated. The synchronizing assembly 31 includes a synchronizing ring 34 having an inner wall 42 with circumferentially arranged apertures 46 to which the bumpers 38 are secured using a pair of fastening elements. In one example, the fastening elements include a fastener 50, which may be a threaded fastener, and a retainer 52. In the example, the retainer 52 includes a generally cylindrical member having a helicoil 54 threadingly secured to the fastener 50 to create a clamping load. A tool 70 (FIG. 2) is used to secure the retainer 52 to the fastener 50 during installation of the bumpers 38.

The bumper 38 includes a hole 44 including a counterbore 66. The fastener 50 and aperture 46 includes interlocking features that cooperate with one another to prevent rotation of the fastener 50 when the retainer 52 is tightened thereto. In the example, the fastener 50 includes opposing machined flats 56, and the aperture 46 includes corresponding flats 58 that cooperate with the flats 56.

A bushing 48 is press fit into the hole 44 with the bushing 48 proud of the hole 44 near the synchronizing ring 34. The bushing 48 also includes a flange 62 in one example that is disposed within and abuts the counterbore 66. The fastener 50 includes a head 64 that engages the flange 62. The bushing 48 extends proud of the inner approximately 0.002 inch (0.05 mm) of the bumper 38 to prevent loading the bushing 48 when the bumper 38 is secured to the synchronizing ring 34 Any loading of the bushing is substantially less than the clamping load, such that no cracking or fatiguing of the bumper occurs. In one example, the load on the bumper 38 is approximately zero.

In the example, a shim 68 is provided between the bumper 38 and the wall 42 to provide the desired clearance between the circumferentially arranged bumpers 38 and the compressor case 32. Thus, the shim 68 and the bushing 48 comprise the loaded structure in the synchronizing assembly 31.

Figure 3A:
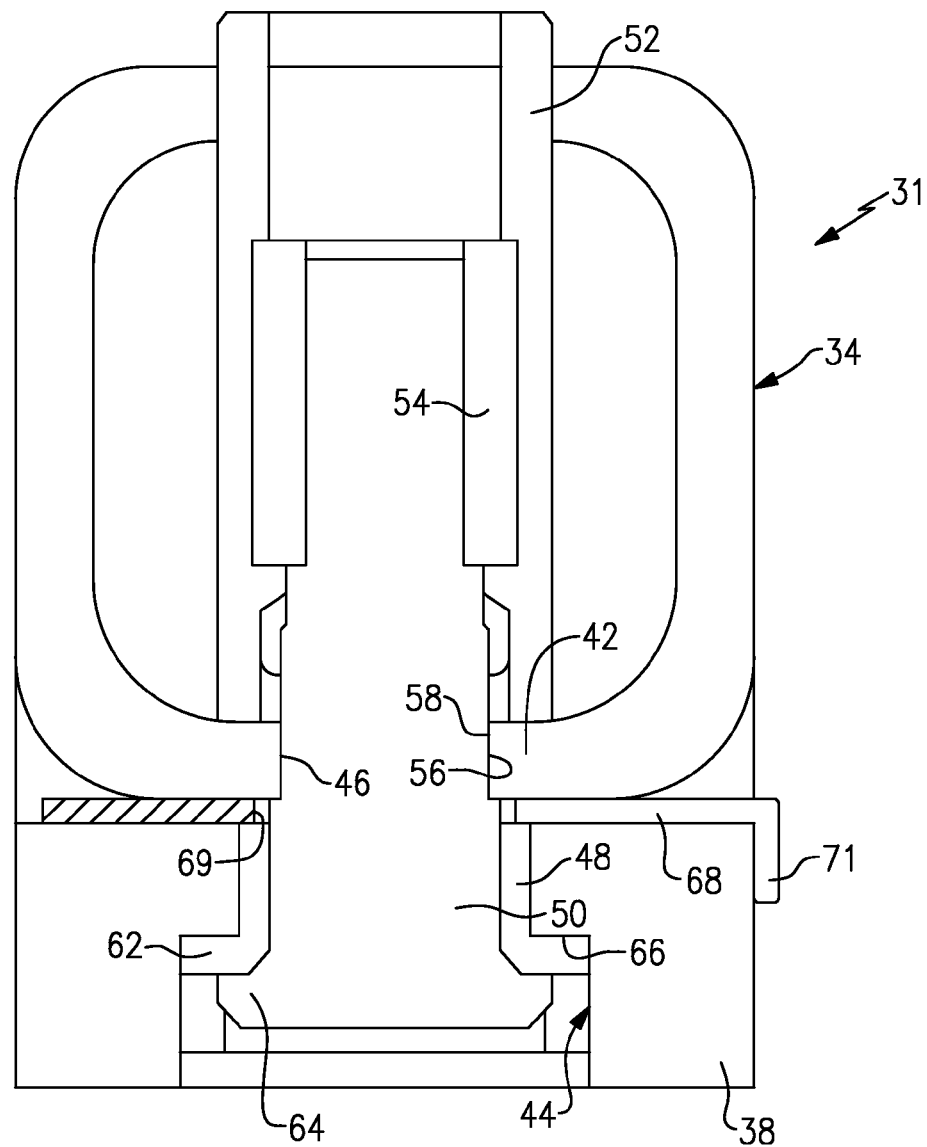
FIG. 3A is a cross-sectional view of the synchronizing assembly and bumper shown in FIG. 2.

The bumper shim procedure helps maintain vane angle accuracy to the actuation system. A typical shim is quite thin, for example, 0.002-0.025 inch (0.051-0.635 mm), such that it cannot be seen. Thus, to ensure that a shim is still in place, the bumper must typically be loosened relative to the synchronizing ring 34. The example shim 68, however, includes a tab 71 that is deformable upon assembly and folded over the bumper 38 to an out-of-plane position in an installed condition compared to a remainder of the shim to visibly indicate the presence of the shim between the bumper 38 and the synchronizing ring 34. As shown in FIGS. 3A-3C, one end of the shim 68 includes a slot 67 that can be slid about one of the bumper fasteners. The shim 68 can then be rotated about the slot 67 such that the slot 69 receives the other bumper fastener. With the shim 68 in place, as illustrated in FIG. 3C, the tab 71 can be deformed along plane P (FIG. 3B) to the position illustrated in FIG. 3A, which retains the shim 68 if the assembly becomes loose.

Returning to FIG. 2, the synchronizing ring 34 includes holes 100 that provide attachments for a clevis (not shown) that cooperates with the actuator 36 as is known. Referring to FIGS. 4A-4C, a bushing 102 (stainless steel, in one example) is received in the hole 100 in an interference fit. In particular, the bushing 102 includes an end having a periphery 104 that is larger than the hole 100. The bushing 102 extends from the end to provide a deformable collar 110 at an opposing end. A shoulder 111 is provided adjacent to the collar 110 to establish an axial position of the bushing 102 upon its insertion into the synchronizing ring 34. The deformable collar 110 is deformed or flared radially outward into engagement with a tapered countersink surface 108 of the synchronizing ring 34 to retain the bushing 102 in its axial position relative to the synchronizing ring 34.

A polymeric bearing 112 is retained within the bushing 102 by a snap-fit. The bearing 112 includes a flange 114 axially locating the bearing 112 relative to the bushing 102. The bearing 112 includes circumferentially spaced legs 116 (separated by gaps 117, which permit resilient deformation of the legs 116) opposite the flange 114 and having lips 118 that axially retain the bearing 112, in cooperation with an annular ledge 120 upon complete insertion of the bearing 112 into the bushing 102.

Although example embodiments have been disclosed, a worker of ordinary skill in this art would recognize that certain modifications would come within the scope of the claims. For that reason, the following claims should be studied to determine their true scope and content.

What is claimed is:

1. A synchronizing assembly for a gas turbine engine comprising:
    a synchronizing ring;
    a composite bumper secured to the synchronizing ring by a fastener;
    a bushing arranged between the bumper and the synchronizing ring;
    a shim arranged between the bushing and the synchronizing ring; and
    wherein the fastener applies a first load serially through the bushing and the shim to the synchronizing ring and a second load through the bumper, the second load substantially less than the first load.

2. The synchronizing assembly according to claim 1, wherein bumper includes a hole, and the bushing is arranged in the hole and extends proud of the bumper on a side of the bumper adjacent to the synchronizing ring.

3. The synchronizing assembly according to claim 2, wherein fastener includes a head that engages the bushing and transmits the first load through the bushing to the synchronizing ring.

4. The synchronizing assembly according to claim 3, wherein the shim includes a deformable tab arranged out-of-plane in an installed condition compared to a remainder of the shim.

5. The synchronizing assembly according to claim 2, wherein the bushing is in an interference fit relative to the hole.

6. The synchronizing assembly according to claim 1, wherein the second load is approximately zero.

7. A synchronizing assembly for a gas turbine engine comprising:
    a synchronizing ring;
    a composite bumper including a hole with a counterbore on a side of the bumper opposite the synchronizing ring;
    a bushing extending through the hole, the bushing proud of the hole on the other side of the bumper and protruding into the counterbore;
    a shim arranged between the bushing and the synchronizing ring; and
    a fastener arranged in the bushing and applying an clamping load through the bushing and the shim to secure the bumper to the synchronizing ring.

8. The synchronizing assembly according to claim 7, wherein fastener includes a head that engages the bushing and transmits the clamping load through the bushing and the shim to the synchronizing ring.

9. The synchronizing assembly according to claim 8, wherein the shim includes a deformable tab arranged out-of-plane in an installed condition compared to a remainder of the shim.

10. The synchronizing assembly according to claim 8, wherein the bushing includes a radial flange arranged within the counterbore, the head engaging the flange.

11. The synchronizing assembly according to claim 7, wherein the synchronizing ring includes an aperture within which the fastener is arranged, the aperture and the fastener including interlocking features rotationally affixing the fastener relative to the synchronizing ring.

12. A synchronizing assembly comprising:
    a synchronizing ring having a hole in a first and second walls spaced apart from one another;
    a bushing in a press-fit relationship with the hole in the first wall, and the bushing include a deformable collar flared into engagement with the second wall; and
    a bearing received by the bushing in a snap-fit relationship, wherein the bearing includes axially extending deformable legs circumferentially spaced from one another, the legs each including a lip, and the lip engaging an annular ledge of the bushing that is adjacent to the deformable collar.

13. The synchronizing assembly according to claim 12, wherein the bushing includes a shoulder abutting the second wall, and the deformable collar engaging the second wall opposite the shoulder.

14. The synchronizing assembly according to claim 13, wherein the second wall is provided between first and second surfaces, the shoulder abutting the first surface, and the deformable collar is entirely between the first and second surfaces.

* * * * *